Sept. 27, 1955   L. H. SMITH ET AL   2,718,743
LAWN TRIMMER AND EDGER
Filed Sept. 15, 1952
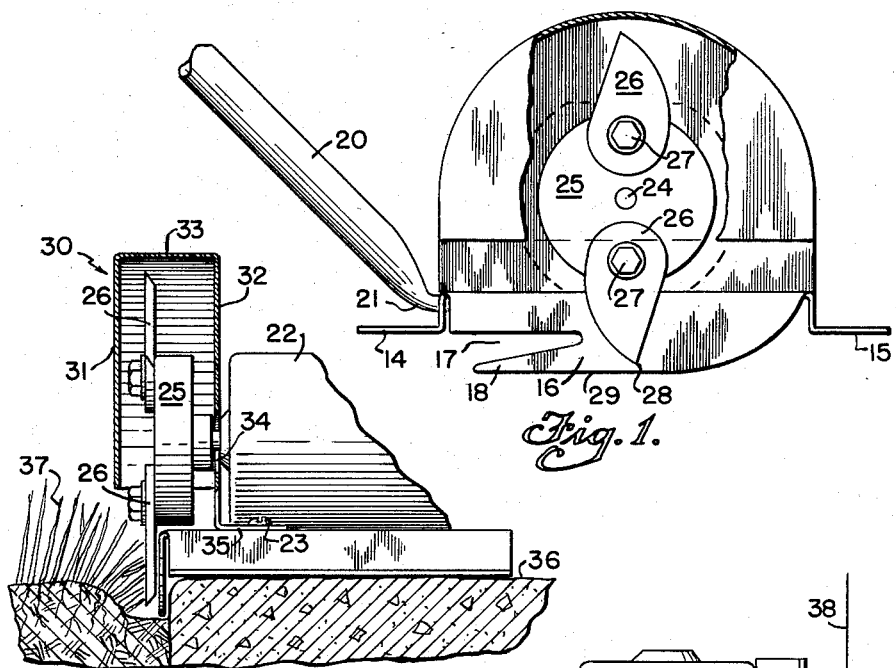
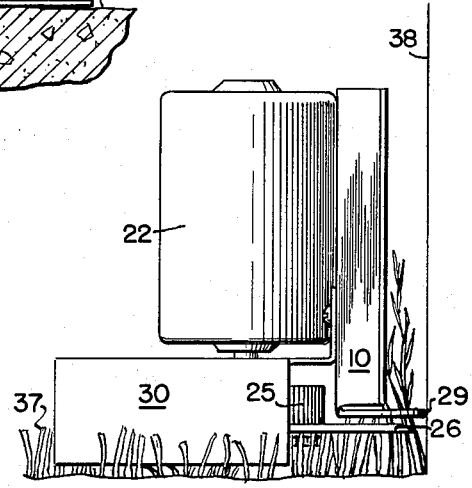
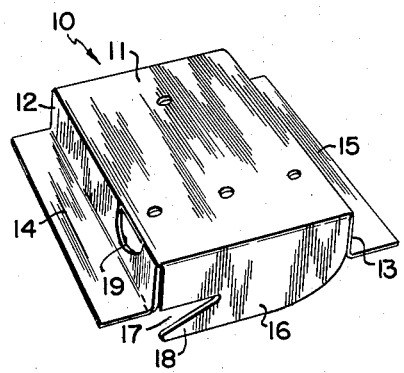
LEE H. SMITH
GEORGE E. KING
INVENTORS
BY *Herbert J. Brown*
ATTORNEY United States Patent Office 2,718,743
Patented Sept. 27, 1955

2,718,743
LAWN TRIMMER AND EDGER
Lee H. Smith and George E. King, Fort Worth, Tex.
Application September 15, 1952, Serial No. 309,686
3 Claims. (Cl. 56—25.4)

This invention relates to lawn trimmers, and has reference to a combined trimmer and edger.

An object of the invention is to provide an efficient yet economical construction for the referred to purposes.

Another object of the invention is to provide a combined lawn trimmer and edger which will not be damaged by rocks or other obstructions in its path of operation.

A particular object of the invention is to provide a stationary guard for the rotating blades of the device, and which guard does not have to be relocated when changing from trimming to edging operations, or vice versa.

Another important object of the invention is to provide a combined lawn trimmer and edger which is slidably supported for either operation, and at the same time spacing the tips of the rotating blades for uniformly cutting the grass.

Figure 1 is a fragmentary side elevational view with parts broken away and shown in section of a combined lawn trimmer and edger embodying the features of the invention.

Figure 2 is a perspective view of the frame of the exemplary form of the invention shown.

Figure 3 is a fragmentary elevational view with parts broken and shown in section of the invention slidably mounted on the upper surface and edge of a sidewalk or curb for edging the grass growing next to the same.

Figure 4 is an elevation of the invention in operation against a wall or the like for trimming the grass adjacent thereto.

The form of the invention shown includes a frame 10 formed of sheet metal and including a rectangular mounting plate 11 and depending flanges 12 and 13 along opposite sides thereof. The lower edges of the flanges 12 and 13 are outwardly formed so as to provide supporting feet 14 and 15 when the device is used in the manner illustrated in Figure 3. One end of the mounting plate 11 is provided with a depending guide blade 16, the lower horizontal edge of which is lower than the feet 14 and 15. A triangular recess 17 is formed in one side of the guide blade 16 so as to provide a hook 18, as shown in Figures 1 and 2. The triangular recess 17 extends nearly to the center of the guide blade 16 for reasons hereinafter set forth. An opening 19 is formed in one of the depending flanges 12 for receiving one end of a handle 20. The end of the handle 20 received within the opening 19 is bent, as at 21 for providing an angular and convenient position for said handle. It will also be noted that the handle receiving opening 19 is positioned to one side of the transverse center of the mounting plate 11, and on the side thereof adjacent the guide blade 16, for balancing the device, and which location must be considered in connection with the distribution of the weight of the parts to be described.

A motor 22 is mounted on the plate 11 by means of screws 23, and has its shaft 24 directed toward the guide blade 16. A fly wheel 25 is mounted on the shaft 24 and arranged with the outer surface of said fly wheel positioned slightly outwardly of the outer surface of said guide blade. Generally triangular cutting blades 26 are mounted on the outer surface of the fly wheel 25 near the periphery thereof, by means of shouldered screws 27 or the like. The blade tips 28, when the blades 26 are in their extended positions, are inwardly of the outer edge 29 of the guide blade 16, but extend outwardly of the imaginary line defined by the feet 14 and 15. The triangular recess 17, heretofore referred to, is positioned whereby the outer ends of the blades 26 pass over the inner end of said recess.

A substantially semicircular guard 30 is positioned over the fly wheel 25, and the radial center of which is around the axis of the motor shaft 24. The guard 30 is comprised of spaced parallel plates 31 and 32 connected with each other by means of an arcuate member 33. The plate 32 adjacent the motor 22 is provided with an opening 34 to accommodate the motor shaft 24, and is additionally provided with outwardly formed brackets 35 for rapidly securing the guard 30 to the upper surface of the frame plate 11, as by means of the previously described screws 23.

When the device is used as an edger, the feet 14 and 15 are placed on the upper surface of a sidewalk or curb 36 with the depending guide blade 16 overhanging the edge of the same. By pulling the handle 20 and sliding the feet 14 and 15 along the sidewalk or curb 36, the grass 37 adjacent thereto is effectively and conveniently edged. When the device is used as an edger, for cutting grass next to a wall or the like 38, the handle 20 is turned so as to place the outer guard plate 31 on the surface of the grass 37 to be cut. Thus, by pulling the handle 20 the grass is conveniently trimmed to the proper height. In both edging and trimming operations the hook 18 positions the grass 37 for the cutting operation.

The invention is not limited to the exemplary construction herein shown and described, but may be made in many ways within the scope of the appended claims.

What is claimed is:

1. In a combined lawn edger and trimmer, a mounting plate having a depending guide blade at one end thereof, a motor mounted on said guide plate and having its shaft parallel with the surface of said plate and directed toward said guide blade, a fly wheel mounted on said shaft, the outer surface of said fly wheel being positioned slightly outwardly of the outer surface of said guide blade, cutter blades pivotally mounted on the outer surface of said fly wheel near the periphery thereof, the free ends of said cutter blades being respectively positioned near the outer edge of said guide blade when said fly wheel is rotating, and means slidably supporting said combined edger and trimmer when the same is used for either of the referred to operations.

2. In a combined lawn edger and trimmer as defined in claim 1, the construction wherein said mounting plate includes depending flanges having feet formed on the lower edges thereof, said feet being positioned on opposite sides of said plate and adjacent the ends of said guide blade.

3. In a combined lawn edger and trimmer as defined in claim 1, the construction wherein said depending guide blade includes a triangular recess in one end thereof and extending substantially to the center thereof so as to provide a hook forming a part of said guide blade for moving grass to said pivoted blades as the latter pass over the inner end of said triangular recess.

References Cited in the file of this patent

UNITED STATES PATENTS

| | | |
|---|---|---|
| 2,115,265 | Jennett | Apr. 26, 1938 |
| 2,410,196 | Benthall | Oct. 29, 1946 |
| 2,476,461 | Smith | July 19, 1949 |
| 2,478,813 | Esleck | Aug. 9, 1949 |
| 2,484,511 | Ingalls | Oct. 11, 1949 |
| 2,491,993 | McClay, Sr. | Dec. 20, 1949 |
| 2,612,741 | McKay | Oct. 7, 1952 |
| 2,621,463 | Skillman | Dec. 16, 1952 |
| 2,628,424 | McMillan et al. | Feb. 17, 1953 |
| 2,654,986 | Gold | Oct. 13, 1953 |